US012482380B2

(12) United States Patent
Carsello

(10) Patent No.: US 12,482,380 B2
(45) Date of Patent: Nov. 25, 2025

(54) GREETING DEVICES FOR PRESENTING A MEDIA ITEM AND ASSOCIATED METHODS FOR MANUFACTURING SUCH DEVICES

(71) Applicant: FUNKO, LLC, Everett, WA (US)

(72) Inventor: Thomas M. Carsello, Seattle, WA (US)

(73) Assignee: FUNKO, LLC, Everett, WA (US)

( * ) Notice: Subject to any disclaimer, the term of this patent is extended or adjusted under 35 U.S.C. 154(b) by 167 days.

(21) Appl. No.: 18/448,001

(22) Filed: Aug. 10, 2023

(65) Prior Publication Data

US 2024/0054918 A1 Feb. 15, 2024

Related U.S. Application Data

(60) Provisional application No. 63/397,123, filed on Aug. 11, 2022.

(51) Int. Cl.
*G09F 1/12* (2006.01)

(52) U.S. Cl.
CPC .................................... *G09F 1/12* (2013.01)

(58) Field of Classification Search
CPC .......... G09F 1/12; A63H 3/005; A44C 25/004
See application file for complete search history.

(56) References Cited

U.S. PATENT DOCUMENTS 4,913,463 A * 4/1990 Tlapek .................... E06B 7/367 16/355
4,984,683 A * 1/1991 Eller .................... A44C 25/004 206/39.7
5,797,507 A * 8/1998 Kramer .................. A63H 3/005 220/4.23
5,944,577 A * 8/1999 Yanofsky ............... A63H 3/005 446/73
5,951,358 A * 9/1999 Hilko ..................... A63H 17/00 206/424
6,026,960 A * 2/2000 Cogliano ............... A63H 3/005 206/457
6,044,561 A * 4/2000 Baraky ..................... B26B 1/02 30/151
6,065,595 A * 5/2000 Ratcliff .................. A01K 97/06 206/315.11
10,093,477 B2 * 10/2018 Di Bona .................. B25H 3/00
11,077,379 B1 * 8/2021 Glasenhardt ............. A63H 3/50
2001/0050449 A1 * 12/2001 Baxter .................. B29B 13/022 249/134
2006/0266079 A1 * 11/2006 Lavictoire ............ A44C 25/004 63/18

(Continued)

*Primary Examiner* — Gary C Hoge
(74) *Attorney, Agent, or Firm* — Perkins Coie LLP

(57) ABSTRACT

Greeting devices are described herein. In some embodiments, a greeting device includes a first shell, a second shell, and a hinge pivotally coupling the first shell to the second shell. The first shell can be configured to carry or house a first substrate, and/or the second shell can be configured to carry or house second substrate. One or both of the first and second substrates can be configured to carry or display a media item, such as a message or greeting. The greeting device can be transitionable between a first configuration in which the first substrate and the second substrate face each other, and a second configuration in which the first substrate and the second substrate face away from each other.

20 Claims, 5 Drawing Sheets

(56) References Cited

U.S. PATENT DOCUMENTS

| | | | | |
|---|---|---|---|---|
| 2008/0204474 | A1* | 8/2008 | Franco | A47G 1/12<br>345/634 |
| 2015/0364112 | A1* | 12/2015 | Kosann | A44C 25/004<br>63/1.11 |
| 2016/0242390 | A1* | 8/2016 | Lynch | A01K 15/025 |
| 2017/0215533 | A1* | 8/2017 | Davis | A44C 25/004 |
| 2020/0330895 | A1* | 10/2020 | Hansen | A63H 33/086 |
| 2021/0402312 | A1* | 12/2021 | Youhua | A63H 3/005 |
| 2022/0126212 | A1* | 4/2022 | Osnato | A44C 27/00 |

* cited by examiner

GREETING DEVICES FOR PRESENTING A MEDIA ITEM AND ASSOCIATED METHODS FOR MANUFACTURING SUCH DEVICES

CROSS-REFERENCE TO RELATED APPLICATION

The present application claims priority to U.S. Prov. App. No. 63/397,123, filed Aug. 11, 2022, titled "GREETING DEVICES FOR PRESENTING A MEDIA ITEM AND ASSOCIATED METHODS FOR MANUFACTURING SUCH DEVICES," the entirety of which is hereby incorporated by reference herein.

TECHNICAL FIELD

The present technology is generally related to greeting devices for presenting a media item and associated methods for manufacturing such devices.

BACKGROUND

Greetings and other messages are commonly given to both children and adults on various occasions. Many greetings can be carried by a device, such as a greeting device, that can be opened or otherwise manipulated to display the greeting or message. However, greeting devices are typically susceptible to failure after repeated uses, which can shorten the functional lifetime of these devices.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Figure 1C:
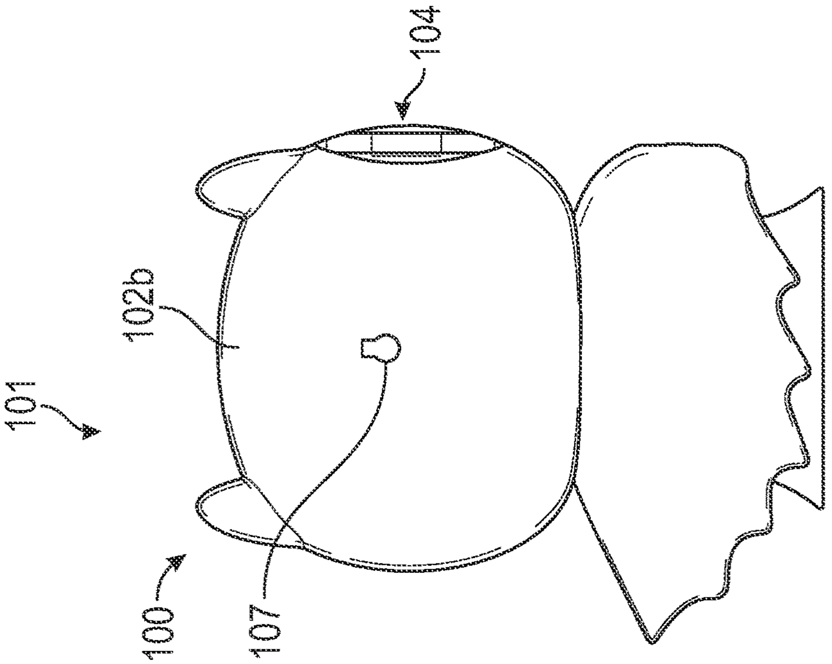
FIG. 1C is a rear view of the greeting device of FIG. 1A.

The present technology is directed generally to greeting devices, including transitionable greeting devices that can be transitioned between configurations to display a media item. In some embodiments, a greeting device includes a first shell, a second shell, and a hinge pivotally coupling the first shell to the second shell. The first shell can include a first inner surface that defines a first interior of the first shell. In at least some embodiments, a first substrate is positioned within the first interior of the first shell and supported therein by one or more first support elements. The second shell can include a second inner surface that defines a second interior of the second shell. In at least some embodiments, a second substrate is positioned within the second interior and supported therein by one or more second support elements. At least one of the first substrate and/or the second substrate can be configured to carry or display a media item, such as a message or greeting. In these and other embodiments, the greeting device can be transitionable between a first (e.g., closed) configuration in which the first substrate and the second substrate face each other, and a second (e.g., open) configuration in which the first substrate and the second substrate face away from each other and/or toward a user.

Specific details of several embodiments of the present technology are described herein with reference to FIGS. 1A-6B. The present technology, however, may be practiced without some of these specific details. In some instances, well-known structures and techniques often associated with springs, levers, fasteners, pins, pivots, etc., have not been shown in detail so as not to obscure the present technology. The terminology used in the description presented below is intended to be interpreted in its broadest reasonable manner, even though it is being used in conjunction with a detailed description of certain specific embodiments of the disclosure. Certain terms may even be emphasized below; however, any terminology intended to be interpreted in any restricted manner will be overtly and specifically defined as such in this Detailed Description section.

The accompanying Figures depict embodiments of the present technology and are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the present technology. Many of the details, dimensions, angles, and other features shown in the Figures are merely illustrative of particular embodiments of the disclosure. Accordingly, other embodiments can have other details, dimensions, angles, and features without departing from the spirit or scope of the present technology.

Reference throughout this specification to relative terms such as, for example, "generally," "approximately," and "about" are used herein to mean the stated value plus or minus 10%.

The headings provided herein are for convenience only and do not interpret the scope or meaning of the claimed present technology.

Figure 1B:
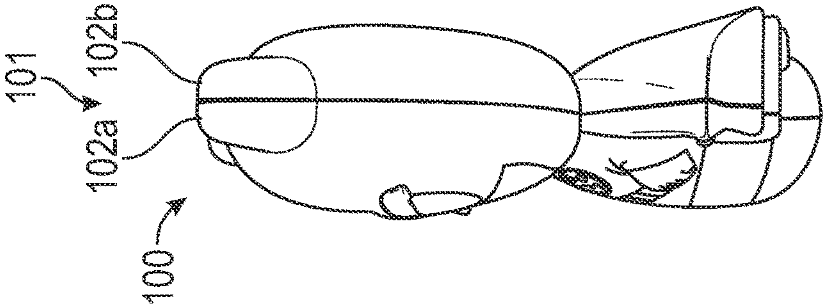
FIG. 1B is a side view of the greeting device of FIG. 1A.
Figure 1A:
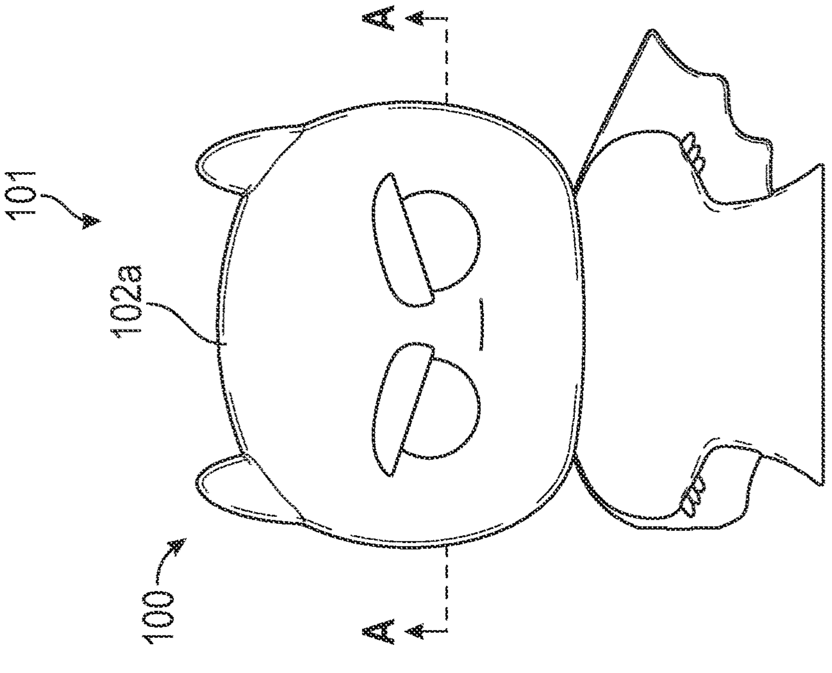
FIG. 1A is a front view of a greeting device in a first configuration in accordance with embodiments of the present technology.

Embodiments of Greeting Devices and Associated Methods of Use and Manufacturing FIGS. 1A-5 show various views of a greeting device 100 ("the device 100") configured in accordance with embodiments of the present technology. Referring to FIGS. 1A-1C, the device 100 can include a first shell 102*a* (which can also be referred to as a first body portion, a first housing portion, and the like) and a second shell 102*b* (which can also be referred to as a second body portion, a second housing portion, and the like). The first and/or second shells 102*a*, 102*b* can be formed from plastics, composites, polymers, metals, a combination thereof, and/or any other suitable material. In at least some embodiments, for example, one or both of the first and second shells 102*a*, 102*b* are formed from acrylonitrile butadiene styrene (ABS), nylon, and/or polyvinyl chloride (PVC). In some embodiments, the first and/or second shells 102*a*, 102*b* can be designed or otherwise shaped to correspond to and/or approximate the appearance of a character or media figure (e.g., a fictional character or media figure, a nonfictional character or media figure, etc.). The device 100 can further include a pivot component 104 (FIG. 1C). The pivot component 104 can pivotally couple the first shell 102*a* to the second shell 102*b*. Referring to FIG. 1C, in the illustrated embodiment the pivot component 104 includes a pinned hinge integrally formed in the first and second shells 102*a*, 102*b*. In these and other embodiments, the pivot component 104 can include a living hinge, or any other suitable pivot component.

In some embodiments, the second shell 102*b* includes a mounting or attachment feature 107 configured to allow the device 100 to be mounted or attached to one or more surfaces. In the illustrated embodiment, the attachment feature 107 includes a slot or recessed area configured, for example, to attach the device 100 to a wall. In at least some embodiments, the attachment feature 107 is configured to releasably receive a nail head, a peg, or another suitably shaped component such that the device 100 can be suspended from and/or supported on a wall or other surface via the attachment feature 107. In other embodiments, the attachment feature 107 can have another suitable configuration.

In FIGS. 1A-1C, the device 100 is shown in a first (e.g., closed) configuration 101. In the first configuration 101, the first and second shells 102*a*, 102*b* can be at least partially aligned with each other. As shown in the embodiment illustrated by FIG. 1A, for example, the first and second shells 102*a*, 102*b* can be aligned with each other when the device 100 is in the first configuration 101 such that, when the device 100 is viewed from the front, the first shell 102*a* covers/obscures all, or at least a portion of, the second shell 102*b*. Similarly, as shown in the embodiment illustrated by FIG. 1C, when the device 100 is viewed from the back, the second shell 102*b* covers/obscures all, or at least a portion of, the first shell 102*a*.

Figure 2A:
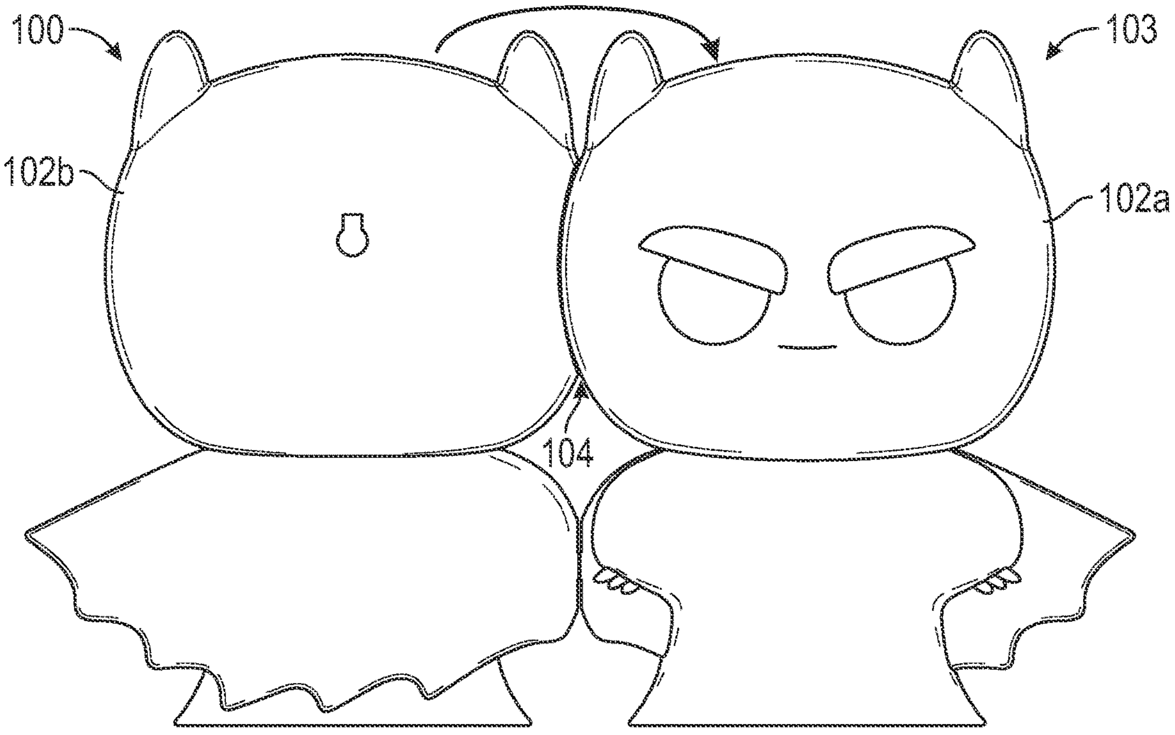
FIG. 2A is a rear view of the greeting device of FIGS. 1A-1C in a second configuration in accordance with embodiments of the present technology.

Referring next to FIG. 2A, the device 100 can be transitioned from the first configuration 101 (FIGS. 1A-1C) to a second (e.g., open) configuration 103 by, for example, rotating/pivoting the first shell 102*a* relative to the second shell 102*b* about a pivot component 104. In the illustrated embodiment, the first shell 102*a* partially overlaps the second shell 102*b* when the device 100 is in the second configuration 103. In other embodiments, however, the first shell 102*a* can be spaced laterally and/or vertically apart from the second shell 102*b* when the device 100 is in the second configuration 103. In these and other embodiments, the first and second shells 102*a*, 102*b* can have any other suitable position and/or orientation relative to each other when the device 100 is in the second configuration 103. In some aspects, greeting devices configured in accordance with embodiments of the present technology can be transitioned between the first (closed) and second (open) configurations 101, 103 with improved repeatability, consistency, and/or without or substantially without wearing or damaging the device. This can be due, at least in part, to the pivot component 104 and/or the material composition of the shells 102*a*, 102*b*. Accordingly, greeting devices configured in accordance with the present technology are expected to have improved durability and/or increased operational lifetimes as compared with conventional devices.

Figure 2B:
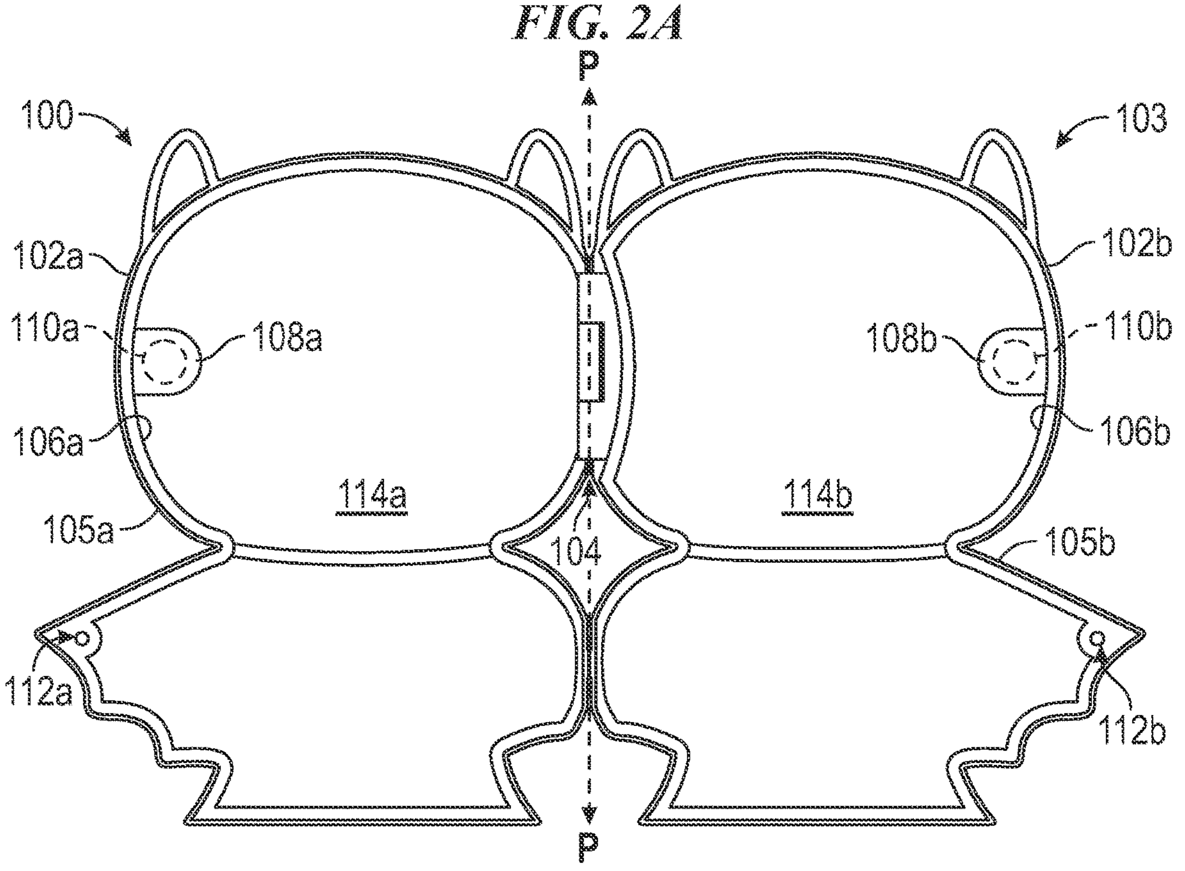
FIG. 2B is a front view of the greeting device of FIG. 2A.

FIG. 2B is a front view of the greeting device 100 of FIG. 2A in the second configuration 103. As best seen in FIG. 2B, the first shell 102*a* can include a first edge or outer perimeter 105*a* extending at least partially around the first shell 102*a* and the second shell 102*b* can include a second edge or outer perimeter 105*b* extending at least partially about the second shell 102*b*. The device 100 can further include one or more components positioned at least partially within one or both of the first and second shells 102*a*, 102*b*. In the illustrated embodiment, for example, the device 100 includes a first frame or liner component 106*a* and a first substrate 114*a* positioned within the first shell 102*a*. The first frame 106*a* can be shaped to correspond to a shape of the first shell 102*a*, and can be positioned inwardly from the edge 105*a* of the first shell 102*a*, e.g., to extend at least partially around an inner perimeter of the first shell 102*a*. The first frame 106*a* can be coupled to the first shell 102*a* via welding (e.g., sonic welding), one or more adhesives, one or more mechanical fasteners, and/or any other suitable coupling technique. The first substrate 114*a* can be formed from paper, cardstock, or any other suitable material, and can be configured to carry and/or display visual content, such as one or more messages, greetings, graphics, images, designs, patterns, and/or any other suitable visual content. In some embodiments, the first substrate 114*a* can have a thickness of about 1 mm. In other embodiments, however, the first substrate 114*a* can have a thickness of less than 1 mm, greater than 1 mm, or any other suitable thickness. The first frame 106*a* can be configured to hold (e.g., house, carry, and the like) the first substrate 114*a* within the device 100. In the illustrated embodiment, for example, the first frame 106*a* is configured to rest on/over the first substrate 114*a* when the first frame 106*a* is coupled to the first shell 102*a*, such that the first substrate 114*a* is positioned at least partially between the first frame 106*a* and the first shell 102*a*. The first substrate 114*a* can be coupled to the first frame 106*a* via welding, one or more adhesives, one or more mechanical fasteners, and/or any other suitable coupling technique. In these and/or other embodiments, the first substrate 114*a* can be held in place by (e.g., solely by) the first frame 106*a*. In the illustrated embodiment, the first frame 106*a* includes a first projection or tab 108*a* extending inwardly from the first frame 106*a*. The first tab 108*a* can be aligned with a first coupling element 110*a* and configured to hold the first coupling element 110*a* within the first shell 102*a*. In the illustrated embodiment, the first coupling element 110*a* includes a first magnet positioned between the first tab 108*a* and the first shell 102*a* such that the magnet is secured behind the first tab 108*a* within the first shell 102*a*. Additionally, or alternatively, the first frame 106*a* can include one or more integral coupling features 112*a*. In the illustrated embodiment, for example, the first frame 106*a* includes a male coupling feature 112*a* extending outwardly from the first frame 106*a* away from the first shell 102*a*.

The second shell 102*b* can include some aspects that are generally similar or identical in structure and/or function to the first shell 102*a*. In the illustrated embodiment, for example, the second shell 102*b* includes a second frame 106*b*, a second tab 108*b*, a second coupling element 110*b*, a female coupling feature 112*b*, and a second substrate 114*b*, each of which can be generally similar or identical in structure and/or function to the corresponding first shell 102*a*, first frame 106*a*, first tab 108*a*, first coupling element 110*a*, male coupling feature 112*a*, and first substrate 114*a*. In other embodiments, one or more of the components positioned within the first and/or second shells 102*a*, 102*b* can be omitted.

In some embodiments, the second substrate **114*b* can be configured to mirror the configuration of the first substrate 114*a* about the pivot component 104. In at least some embodiments, for example, the shape and/or position of the second substrate 114*b* can be the mirror of the shape and/or position of the first substrate 114*a* about a pivot axis P of the pivot component 104. Accordingly, in the second configuration 103, the first and second substrates 114*a*, 114*b* can be generally or substantially equidistant from the pivot axis P. Additionally, or alternatively, the first and second substrates 114*a*, 114*b* can be parallel and/or coplanar to each other when the device 100 is in the second configuration 103. In at least some embodiments, the first and second substrates 114*a*, 114*b* can face away from each other (e.g., in a generally similar, a same, or a parallel direction) when the device 100 is in the second configuration 103. In other embodiments, the first substrate 114*a* can be at an angle (not shown) relative to the second substrate 114*b* when the device 100 is in the second configuration 103. The angle can be an interior angle between about 0 degrees and about 180 degrees, or any other suitable angle. In these and other embodiments, the second substrate 114*b* can be spaced laterally apart from the first substrate 114*a* when the device 100 is in the second configuration 103**.

The first and second coupling elements **110*a*, 110*b* and/or the first and second coupling features 112*a*, 112*b* can be positioned to matingly engage each other (e.g., the first coupling element 110*a* with the second coupling element 110*b* and/or the first coupling feature 112*a* with the second coupling feature 112*b*) to at least partially prevent the device 100 from transitioning from the first configuration 101 (FIGS. 1A-1C) toward the second configuration 103 (FIGS. 2A and 2B). In some embodiments, for example, the second coupling element 110*b* includes a second magnet configured to matingly engage with the first magnet of the first coupling element 110*a* when the device 100 is in the first configuration 101 (FIGS. 1A-1**C).

Figure 3:
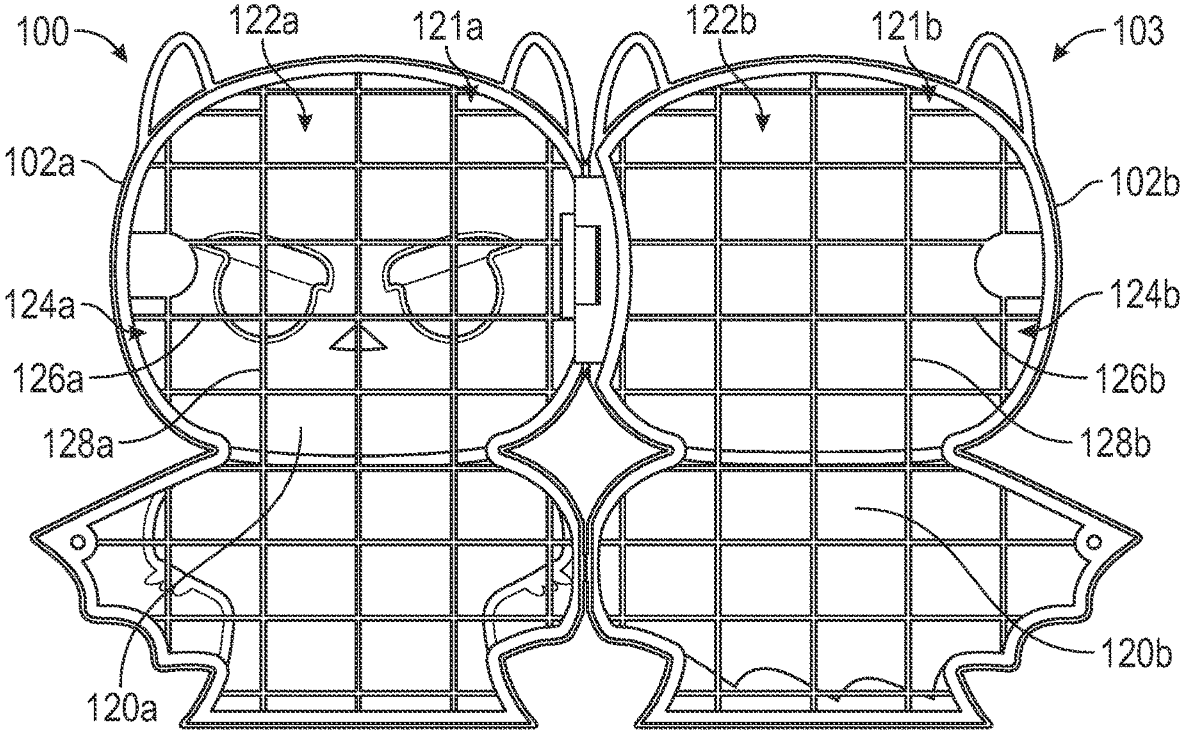
FIG. 3 is a front view of select aspects of the greeting device of FIG. 2A in accordance with embodiments of the present technology.

FIG. 3 is a front view of the device 100 in the second configuration 103 and with the first and second substrates **114*a*, 114*b* (FIG. 2B) omitted to illustrate select aspects of the present technology. As best seen in FIG. 3, one or both of the first and second shells 102*a*, 102*b* can include a respective curved or concave inner surface 120*a*, 120*b* that defines a respective opening 121*a*, 121*b* of a corresponding interior or chamber 122*a*, 122*b*. The components described in detail with reference to FIG. 2B (e.g., the first substrate 114*a*, the first coupling component 110*a*, etc.) can be positioned within the interiors 122*a*, 122*b* of the first and/or second shells 102*a*, 102*b*, as described with reference to FIG. 2B. Additionally, in the illustrated embodiment, the first shell 102*a* further includes one or more first support elements 124*a* positioned within the first interior 122*a*. The first support elements 124*a* can extend outwardly from the first inner surface 120*a* toward the first opening 121*a* and can be configured to support the first substrate 114*a* (FIG. 2B) within the interior 122*a*. The first support elements 124*a* can include one or more first lateral support elements 126*a* that extend in a direction generally parallel to a width of the first shell 102*a* and/or one or more first longitudinal support elements 128*a* that extend in a direction generally parallel to a length or longitudinal axis of the first shell 102*a*. In the illustrated embodiment, the first support elements 124*a* include an array of intersecting lateral support elements 126*a* and longitudinal support elements 128*a*. In these and other embodiments, the first support elements 124*a* can include one or more angled support elements (not shown) that extend diagonally relative to the longitudinal axis of the first shell 102*a*, and/or support elements having any other suitable orientation. Although the first support elements 124*a* have a linear shape in the embodiment illustrated in FIG. 3, in other embodiments at least some of the first support elements 124*a*** can have a curved shape, a rectilinear shape, a non-linear, a zig-zag, a serpentine shape, a circular shape, a rectangular shape, a triangular shape, or any other suitable shape.

The second shell **102*b* can include one or more second support elements 124*b*, and at least some of the second support elements 124*b* can be generally similar or identical in structure and/or function to the first support element 124*a*. In the illustrated embodiment, for example, the second support elements 124*b* include one or more second lateral support elements 126*b* that are generally similar or identical in structure and/or function to the first lateral support elements 126*a* and/or one or more second longitudinal support elements 128*b* that are generally similar or identical in structure and/or function to the first longitudinal support elements 128*a*. In these and other embodiments, at least some of the second support elements 124*b*** can have any other suitable configuration.

Figure 4:
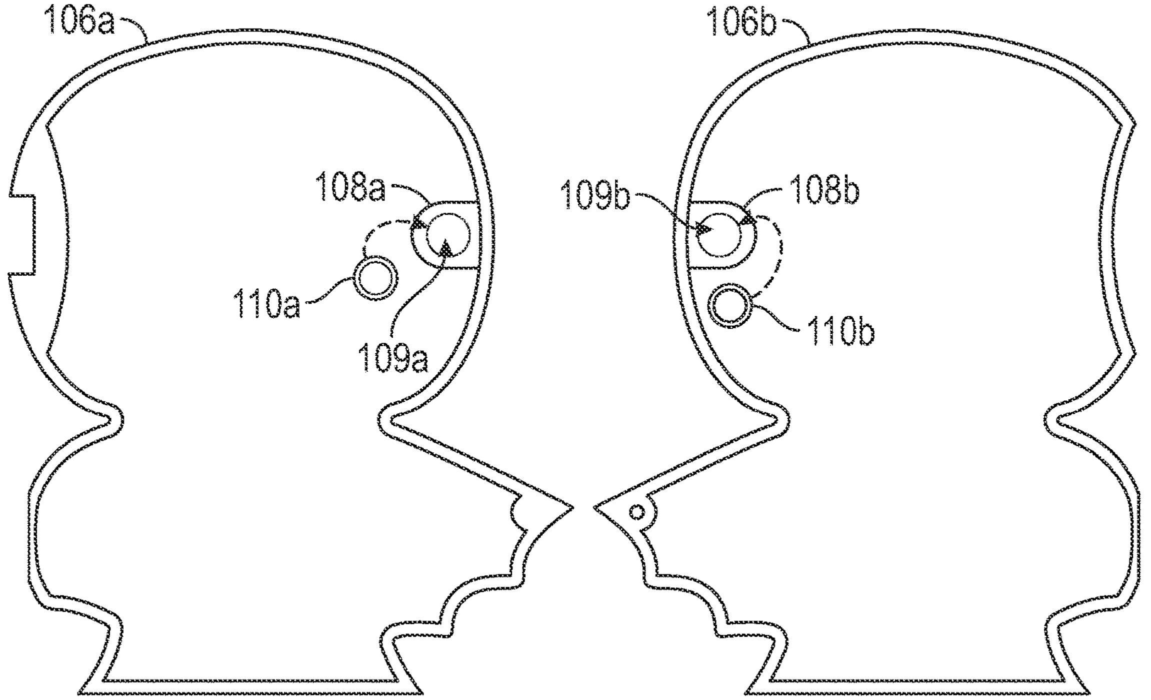
FIG. 4 is a perspective view of select aspects of the greeting device of FIG. 1A in accordance with embodiments of the present technology.

FIG. 4 is a perspective view of the first and second frames **106*a*, 106*b* before installation with the corresponding shells 102*a*, 102*b*, respectively. In FIG. 4, the first and second frames 106*a*, 106*b* have been flipped 180 degrees relative to their respective orientations in FIG. 2B. In the illustrated embodiment, the first and second coupling elements 110*a*, 110*b* include corresponding magnets, and the first and second tabs 108*a*, 108*b* each includes a recess or indent 109*a*, 109*b* configured to receive the respective coupling element 110*a*, 110*b*. The recesses 109*a*, 109*b* can be formed in the back or underside of the respective first and second tabs 108*a*, 108*b* such that, when the frames 106*a*, 106*b* are coupled to the corresponding shells 102*a*, 102*b*, the respective coupling elements 110*a*, 110*b* can be secured within the recesses 109*a*, 109*b*, as shown by the dashed-line arrows in FIG. 4, between the respective first and second frames 106*a*, 106*b* and the associated first and second substrates 114*a*, 114*b* (FIG. 2**B).

Figure 5:
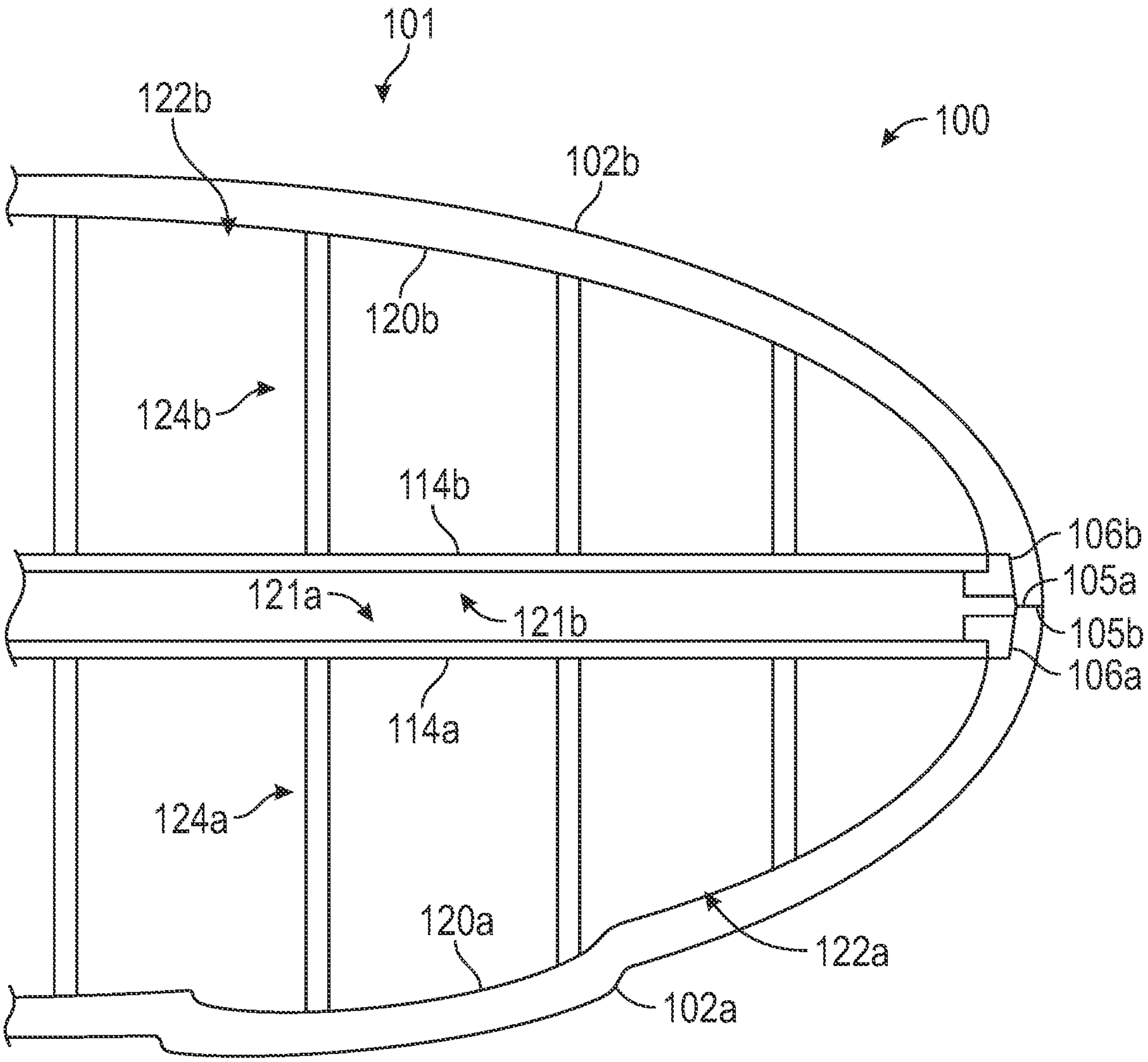
FIG. 5 is a cross-sectional view of the greeting device taken along section line A-A of FIG. 1A.

FIG. 5 is a cross-sectional view of the device 100 taken substantially along section line A-A of FIG. 1A. In the illustrated embodiment, the first edge **105*a* of the first shell 102*a* is configured to contact the second edge 105*b* of the second shell 102*b* when the device 100 is in the first configuration 101. The first and second frames 106*a*, 106*b* can be recessed from/parallel to the corresponding first and second edges 105*a*, 105*b*. The first and second substrates 114*a*, 114*b* can be supported within the associated first and second interior 122*a*, 122*b* at least partially between the corresponding first and second support elements 124*a* and the first and second frames 106*a*, 106*b*. When the device 100 is in the first configuration 101, the first substrate 114*a* can be aligned (e.g., vertically) with the second substrate 114*b*, and the first substrate 114*a* can be spaced apart from and/or face toward the second substrate 114*b***.

Figure 6B:
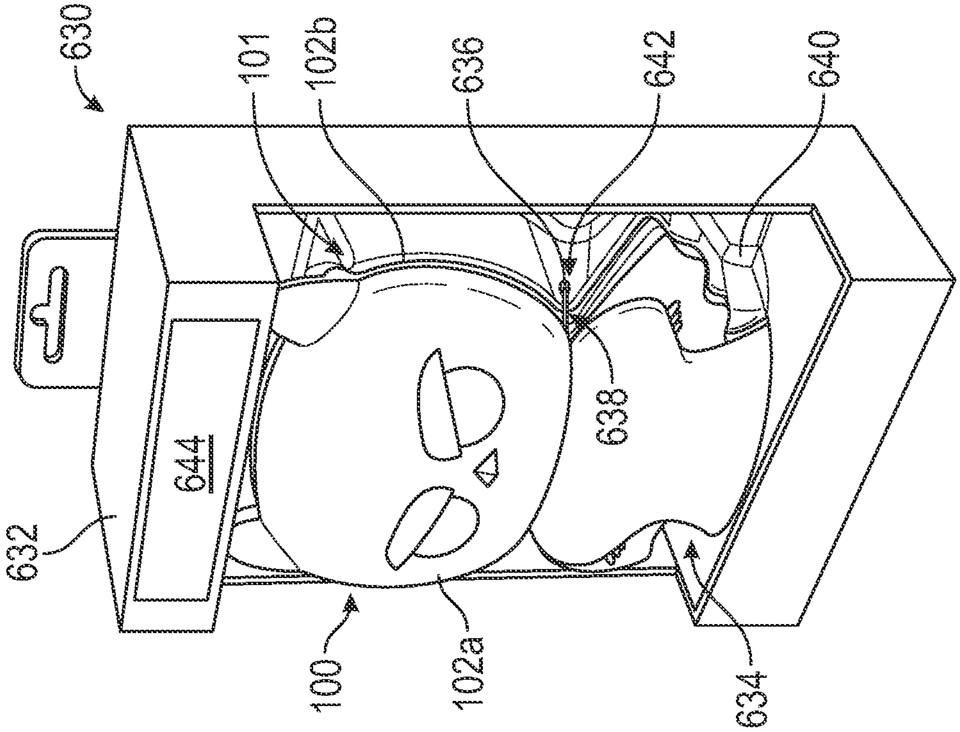
FIGS. 6A and 6B are perspective views of the greeting device of FIG. 1A and packaging configured in accordance with embodiments of the present technology.
Figure 6A:
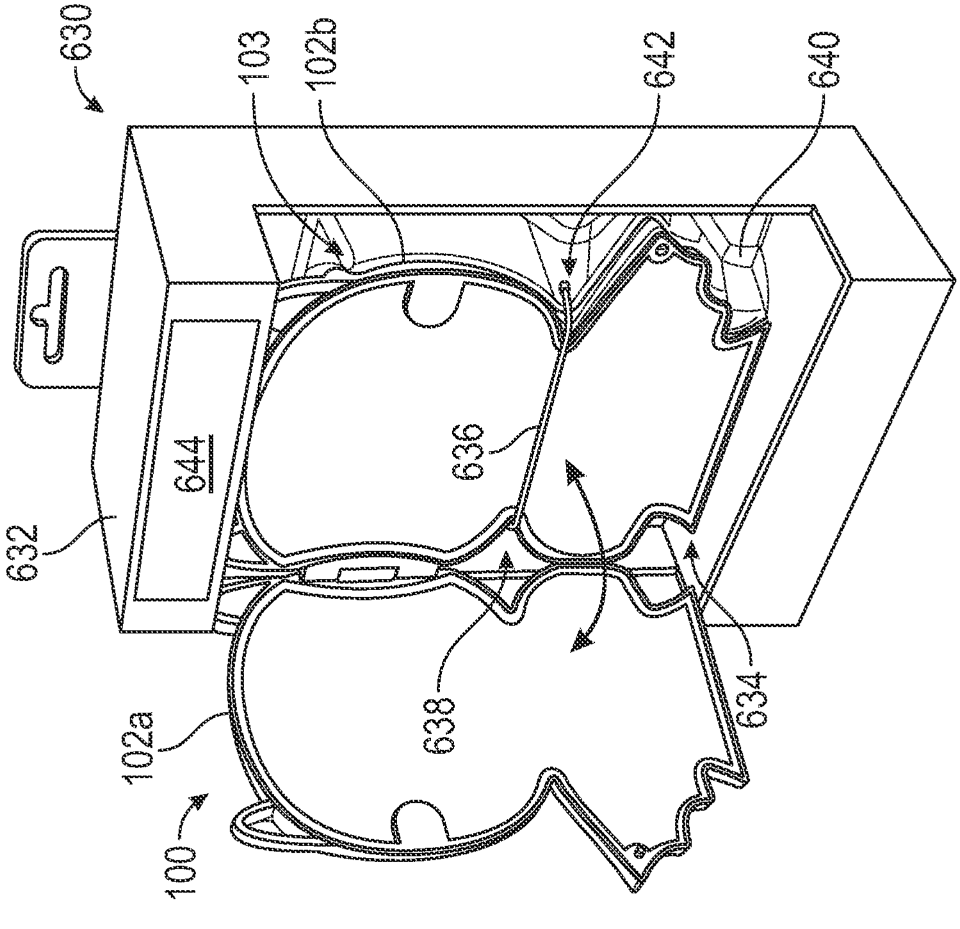

FIGS. 6A and 6B are perspective views of the greeting device 100 and packaging 630 configured in accordance with embodiments of the present technology. The packaging 630 can be open to users so that users can inspect, touch, and/or otherwise interact with the device 100, such as by transitioning the device 100 between the first configuration 101 (shown in FIG. 6B) and the second configuration 103 (shown in FIG. 6A). Additionally, or alternatively, the packaging 630 can include text, graphics, and/or another suitable media content item 644 inviting users to "Try Me," "Open," or otherwise interact with the device 100.

The packaging 630 can include a housing or container 632 that defines a chamber or device-receiving space 634 configured to receive the device 100, and a coupling component 636 configured to couple the device 100 to the packaging 630 within the device-receiving space 634. The coupling component 636 can include an elongate member or cord configured to extend at least partially around a narrowed or necked portion 638 of the second shell 102*b* of the device 100, as shown in FIG. 6A, to thereby couple the device 100 to the packaging 630. Accordingly, when the device 100 is in the first configuration 101, at least a portion of the coupling component 636 can be positioned (e.g., "sandwiched") between the first and second shells 102*a*, 102*b*, as shown in FIG. 6B.

The device-receiving space 634 and the coupling component 636 can be configured to allow the first shell 102*a* to rotate relative to the second shell 102*b* (e.g., in the directions indicated by the double-headed arrow in FIG. 6A), such that a user can transition the device 100 between the first configuration 101 and the second configuration 103 while the device 100 is coupled to the packaging 630. Additionally, or alternatively, the first shell 102*a* can be configured to be coupled to the packaging 630 by the coupling component 636 in a generally similar or identical manner as the second shell 102*b*. In at least some embodiments, for example, the first shell 102*a* can be coupled to the packaging 630 and the second shell 102*b* can be rotated relative to the first shell 102*a* to transition the device 100 between the first and second configurations 101, 103.

In some embodiments, the packaging 630 includes a device-supporting component 640 positioned within the device-receiving space 634 and configured to hold the device 100 therein. The device-supporting component 640 can include, for example, blister packaging configured to correspond to the shape of the device 100. In the illustrated embodiment, the device-supporting component 640 includes one or more holes 642 configured to receive the coupling component 636, such that the coupling component 636 can couple the device 100 to the device-supporting component 640. In some embodiments, the device-supporting component 640 can be coupled to the packaging 630, for example, via one or more adhesives, mechanical fasters, or another suitable coupling technique.

CONCLUSION

The above-detailed description of embodiments of the present technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

I claim:

1. A greeting device, comprising:

a first shell having a first inner surface that defines a first interior of the first shell, the first shell including (i) a first substrate positioned within the first interior, (ii) a first support element positioned between the first substrate and the first inner surface, and (iii) a first frame extending at least partially around a first inner perimeter of the first shell, wherein the first frame is configured to couple the first substrate to the first shell;

a second shell having a second inner surface that defines a second interior of the second shell, the second shell including (i) a second substrate positioned within the second interior, (ii) a second support element positioned between the second substrate and the second inner surface, and (iii) a second frame extending at least partially around a second inner perimeter of the second shell, wherein the second frame is configured to couple the second substrate to the second shell; and a hinge pivotally coupling the first shell to the second shell, wherein the greeting device is transitionable between (i) a first configuration in which the first substrate and the second substrate face each other, and (ii) a second configuration in which the first substrate and the second substrate face away from each other.

2. The greeting device of claim 1 wherein, in the second configuration, the first substrate is coplanar with the second substrate.

3. The greeting device of claim 1 wherein, in one or both of the first configuration and the second configuration, the first substrate is parallel to the second substrate.

4. The greeting device of claim 1 wherein, in one or both of the first configuration and the second configuration, the first substrate is angled relative to the second substrate.

5. The greeting device of claim 4 wherein the angle is an interior angle between 0 degrees and 180 degrees.

6. The greeting device of claim 1 wherein:

the first shell further includes a first edge;

the second shell further includes a second edge; and in the first configuration, the first edge contacts the second edge.

7. The greeting device of claim 6, wherein:

the first shell further includes a first frame, wherein the first frame is carried by the first shell and positioned over at least a portion of the first substrate to secure the first substrate between the first frame and the first support element; and the second shell further includes a second frame, wherein the second frame is carried by the second shell and positioned over at least a portion of the second substrate to secure the second substrate between the second frame and the second support element.

8. The greeting device of claim 1 wherein at least part of the first shell is shaped to correspond to at least part of the second shell such that, in the first configuration, the first shell matingly engages the second shell to at least partially obscure visualization of both the first substrate and the second substrate.

9. The greeting device of claim 8 wherein, in the first configuration, the first shell and the second shell are positioned at least partially between the first substrate and the second substrate.

10. The greeting device of claim 1 wherein:

the first shell further includes a first coupling component;

the second shell further includes a second coupling component; and in the first configuration, the first coupling component is configured to matingly engage the second coupling component to at least partially prevent the greeting device from transitioning toward the second configuration.

11. The greeting device of claim 10 wherein the first coupling component includes a first magnet and the second coupling component includes a second magnet.

12. The greeting device of claim 10 wherein the first coupling component includes a projection, and the second coupling component includes a recess configured to releasably receive the projection.

13. The greeting device of claim 1 wherein the first shell or the second shell includes a narrowed portion configured to couple the associated first shell or the second shell to packaging.

14. A greeting device, comprising:

a first housing portion defining a first chamber configured to contain a first substrate, wherein the first housing portion includes a first coupling element and a first frame extending at least partially around a first inner perimeter of the first housing portion, the first frame configured to couple the first substrate to the first housing portion;

a second housing portion defining a second chamber configured to contain a second substrate, wherein the second housing portion includes a second coupling element and a second e extending at least partially around a second inner perimeter of the second housing portion, the second frame configured to couple the second substrate to the second housing portion; and a hinge pivotally coupling the first housing portion to the second housing portion such that the first housing portion is pivotable relative to the second housing portion to allow the first coupling element to matingly engage the second coupling element to at least partially prevent rotation of the first housing portion relative to the second housing portion.

15. The greeting device of claim 14 wherein the first substrate and/or the second substrate are configured to carry a media item including readable indicia or other markings.

16. The greeting device of claim 14 wherein the first housing portion and the second housing portion are rotatable relative to one another to transition the greeting device between (i) a first configuration in which the first substrate and the second substrate face each other, and (ii) a second configuration in which the first substrate and the second substrate face away from each other.

17. A message transportation device, comprising:

a first concave casing defining a chamber having an opening, wherein the first concave casing includes— a message substrate positioned within the chamber, and one or more support struts positioned within the chamber and between the message substrate and the first concave casing; and a second concave casing pivotally coupled to the first concave casing and transitionable between (i) a first position in which the second concave casing is positioned above the message substrate and least partially covering the opening, and (ii) a second position, in which the second concave casing is positioned laterally from the opening.

18. The message transportation device of claim 17, further comprising packaging configured to carry the first concave casing and/or the second concave casing, wherein the packaging includes a coupling configured to be received by a narrowed portion of the first concave casing or the second concave casing to releasably couple the first concave casing and the second concave casing to the packaging.

19. The message transportation device of claim 17, further comprising a frame coupled to the first concave casing around an interior perimeter of the opening, wherein the message substrate is positioned between the frame and the one or more support struts.

20. The message transportation device of claim 17 wherein:

the first concave casing further includes a first coupling feature;

the second concave casing further includes a second coupling feature; and in the first position, the first coupling feature is configured to couple to the second coupling feature to at least partially prevent the message transportation device from being moved toward the second position.

* * * * *